United States Patent
Sun et al.

(10) Patent No.: US 11,962,368 B2
(45) Date of Patent: Apr. 16, 2024

(54) DOPPLER SHIFT ESTIMATE REPORTING WITH PRE-COMPENSATION

(71) Applicant: Apple Inc., Cupertino, CA (US)

(72) Inventors: Haitong Sun, Irvine, CA (US); Dawei Zhang, Saratoga, CA (US); Wei Zeng, San Diego, CA (US); Yushu Zhang, Beijing (CN); Chunxuan Ye, San Diego, CA (US); Jie Cui, San Jose, CA (US); Huaning Niu, San Jose, CA (US)

(73) Assignee: Apple Inc., Cupertino, CA (US)

( * ) Notice: Subject to any disclaimer, the term of this patent is extended or adjusted under 35 U.S.C. 154(b) by 349 days.

(21) Appl. No.: 17/439,438

(22) PCT Filed: May 7, 2021

(86) PCT No.: PCT/CN2021/091981
§ 371 (c)(1),
(2) Date: Sep. 15, 2021

(87) PCT Pub. No.: WO2022/233013
PCT Pub. Date: Nov. 10, 2022

(65) Prior Publication Data
US 2023/0239010 A1 Jul. 27, 2023

(51) Int. Cl.
*H04B 17/00* (2015.01)
*H04B 7/01* (2006.01)
*H04B 17/364* (2015.01)

(52) U.S. Cl.
CPC ............. *H04B 7/01* (2013.01); *H04B 17/364* (2015.01)

(58) Field of Classification Search
CPC ...... H04B 7/01; H04B 17/364; H04B 17/373; H04B 7/155; H04B 7/15528
See application file for complete search history.

(56) References Cited

U.S. PATENT DOCUMENTS

2009/0312038 A1   12/2009   Gildea
2021/0211912 A1*   7/2021   Zeng ..................... H04L 5/1461
(Continued)

FOREIGN PATENT DOCUMENTS

CN   101980453 A   2/2011
CN   103037425 A   4/2013
(Continued)

OTHER PUBLICATIONS

International Search Report and Written Opinion for PCT/CN2021/091981; 10 pages; dated Jan. 26, 2022.

*Primary Examiner* — Tuan Pham
(74) *Attorney, Agent, or Firm* — Kowert, Hood, Munyon, Rankin & Goetzel, P.C.

(57) ABSTRACT

A first cellular base station transmits a configuration message to a reporting device installed on a high-speed vehicle. The configuration message specifies one or more parameters of a Doppler measurement report. The reporting device performs one or more first Doppler measurements on the first base station and/or one or more second Doppler measurements on a second base station. The reporting device transmits the Doppler measurement report to the first and/or second base stations. The Doppler measurement report may be used by the first and/or second base stations to perform Doppler pre-compensation on transmissions to the reporting device.

20 Claims, 8 Drawing Sheets

(56) References Cited

U.S. PATENT DOCUMENTS

2021/0235342 A1* 7/2021 Zhu .................... H04B 7/01
2023/0064231 A1* 3/2023 Haghighat ............ H04W 72/23

FOREIGN PATENT DOCUMENTS

| CN | 112514276 A | 3/2021 |
| CN | 112968746 A | 6/2021 |
| WO | 2021008450 A1 | 12/2009 |

* cited by examiner

```
CSI-Reporting ::=             SEQUENCE {
    reportConfigId                CSI-ReportConfigId,
    carrier                       servCellIndex            OPTIONAL,    --Need S
    resourcesForChannelMeasurement CSI-ResourceConfigId,
    csi-IM-ResourceForInterference CSI-ResourceConfigId    OPTIONAL,    --Need R
    nzp-CSI-RS-resourceForInterference CSI-ResourceConfigId OPTIONAL,   --Need R
```

FIG. 8

```
CSI-AssociatedReportConfigInfo ::= SEQUENCE {
    reportConfigId        CSI-ReportConfigId,
    resourcesForChannel   CHOICE {
        nzp-CSI-RS            SEQUENCE {
            resourceSet           INTEGER (1..maxNrofNZP-CSI-RS-ResourceSetsPerConfig),|
            qcl-info              SEQUENCE (SIZE(1..maxNrofAP-CSI-RS-ResourcePerSet)) OF TCI-stateId
                                                                      OPTIONAL - Cond Aperiodic
        },
        csi-SSB-ResourceSet   INTEGER (1..maxNrofCSI-SSB-ResourceSetsPerConfig)
    },
```

FIG. 9

```
reportQuantity              CHOICE {
    none                        NULL,
    cri-RI-PMI-CQI              NULL,
    cri-RI-i1                   NULL,
    cri-RI-i1-CQI               SEQUENCE {
        pdsch-BundleSizeForCSI      ENUMERATED {n2, n4}
    },
    cri-RI-CQI                  NULL,
    cri-RSRP                    NULL,
    ssb-Index-RSRP              NULL,
    cri-RI-LI-PMI-CQI           NULL
},
```

*FIG. 10*

CSI computation delay requirement 1

| μ | Z₁ [symbols] ||
|---|---|---|
| | $Z_1$ | $Z'_1$ |
| 0 | 10 | 8 |
| 1 | 13 | 11 |
| 2 | 25 | 21 |
| 3 | 43 | 36 |

*FIG. 11A*

CSI computation delay requirement 2

| μ | Z₁ [symbols] || Z₂ [symbols] ||||
|---|---|---|---|---|---|---|
| | $Z_1$ | $Z'_1$ | $Z_2$ | $Z'_2$ | $Z_3$ | $Z'_3$ |
| 0 | 22 | 16 | 40 | 37 | 22 | $X_0$ |
| 1 | 33 | 30 | 72 | 69 | 33 | $X_1$ |
| 2 | 44 | 42 | 141 | 140 | $\underline{min(44, X_2+KB_1)}$ | $X_2$ |
| 3 | 97 | 85 | 152 | 140 | $\underline{min(97, X_3+KB_2)}$ | $X_3$ |

*FIG. 11B*

DOPPLER SHIFT ESTIMATE REPORTING WITH PRE-COMPENSATION

PRIORITY CLAIM INFORMATION

This application is a national stage application of International Application No. PCT/CN2021/091981, filed on May 7, 2021, titled "Doppler Shift Estimate Reporting with Pre-Compensation", which is hereby incorporated by reference in its entirety.

FIELD

The present application relates to wireless communications, and more particularly to systems, apparatuses, and methods for providing Doppler shift information in a cellular communication system.

DESCRIPTION OF THE RELATED ART

Wireless communication systems are rapidly growing in usage. In recent years, wireless devices such as smart phones and tablet computers have become increasingly sophisticated. In addition to supporting telephone calls, many mobile devices (i.e., user equipment devices or UEs) now provide access to the internet, email, text messaging, and navigation using the global positioning system (GPS), and are capable of operating sophisticated applications that utilize these functionalities. Additionally, there exist numerous different wireless communication technologies and standards. Some examples of wireless communication standards include GSM, UMTS (associated with, for example, WCDMA or TD-SCDMA air interfaces), LTE, LTE Advanced (LTE-A), NR, HSPA, 3GPP2 CDMA2000 (e.g., 1×RTT, 1×EV-DO, HRPD, eHRPD), IEEE 802.11 (WLAN or Wi-Fi), BLUETOOTH™, etc.

Effectively performing cellular communications may be complicated by Doppler shift in a high-mobility scenario such as cellular communications on a high-speed train (HST). In some deployments, the network may pre-compensate for the Doppler shift experienced by a rapidly moving UE. However, the network may not be aware of the degree of Doppler shift to be pre-compensated. Accordingly, improvements in the field are desired.

SUMMARY

Embodiments are presented herein of apparatuses, systems, and methods for a reporting device to transmit a Doppler measurement report to a cellular base station. The reporting device may be a cellular transceiver installed on a high-speed vehicle, and the cellular base station may be a 5G NR gNB, in some embodiments.

In some embodiments, the reporting device receives a configuration message from a first base station specifying one or more parameters of a Doppler measurement report.

In some embodiments, the reporting device performs one or more first Doppler measurements on the first base station and/or one or more second Doppler measurements on a second base station. The Doppler measurements measure a Doppler shift experienced by transmissions between the reporting device and the base stations.

In some embodiments, the reporting device transmits the Doppler measurement report to the first and/or second base stations, where the Doppler measurement report is based on the one or more first Doppler measurements and the one or more parameters. The Doppler measurement report may specify a differential between Doppler shifts of the first and second base stations. The Doppler measurement report may be used by the first and/or second base stations to perform Doppler pre-compensation on transmissions to the reporting device.

Note that the techniques described herein may be implemented in and/or used with a number of different types of devices, including but not limited to base stations, access points, cellular phones, portable media players, tablet computers, wearable devices, and various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

FIG. 8 illustrates an example message format for a CSI-Reporting information element (IE), according to some embodiments;

FIG. 9 illustrates an example message format for a CSI-AssociatedReportConfigInfo IE, according to some embodiments;

FIG. 10 illustrates an example message format for a reportQuantity IE, according to some embodiments; and FIGS. 11A and 11B are tables illustrating low and high latency requirements, respectively, for channel state information (CSI) reporting, according to some embodiments.

Figure 1:
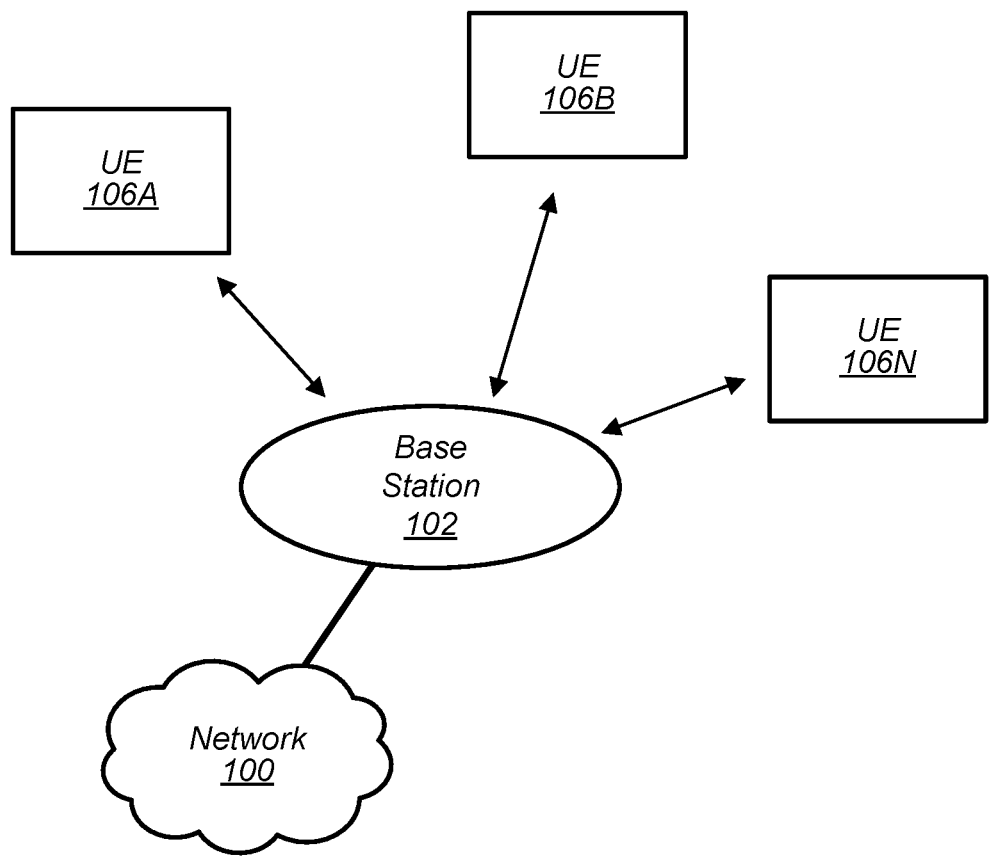
FIG. 1 illustrates an exemplary (and simplified) wireless communication system, according to some embodiments.

While features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

Various acronyms are used throughout the present disclosure. Definitions of the most prominently used acronyms that may appear throughout the present disclosure are provided below:

UE: User Equipment
RF: Radio Frequency
BS: Base Station
GSM: Global System for Mobile Communication
UMTS: Universal Mobile Telecommunication System
LTE: Long Term Evolution
NR: New Radio
TX: Transmission/Transmit
RX: Reception/Receive
MIMO: Multiple Input Multiple Output
RAT: Radio Access Technology
TRS: Tracking Reference Signal Terms The following is a glossary of terms that may appear in the present disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer system for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Computer System (or Computer)—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" may be broadly defined to encompass any device (or combination of devices) having at least one processor that executes instructions from a memory medium.

User Equipment (UE) (or "UE Device")—any of various types of computer systems or devices that are mobile or portable and that perform wireless communications. Examples of UE devices include mobile telephones or smart phones (e.g., iPhone™, Android™-based phones), tablet computers (e.g., iPad™, Samsung Galaxy™), portable gaming devices (e.g., Nintendo DS™, PlayStation Portable™, Gameboy Advance™, iPhone™), wearable devices (e.g., smart watch, smart glasses), laptops, PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Wireless Device—any of various types of computer systems or devices that perform wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station (BS)—The term "Base Station" has the full breadth of its ordinary meaning, and at least includes a wireless communication station installed at a fixed location and used to communicate as part of a wireless telephone system or radio system.

Processing Element (or Processor)—refers to various elements or combinations of elements that are capable of performing a function in a device, e.g. in a user equipment device or in a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Wi-Fi—The term "Wi-Fi" has the full breadth of its ordinary meaning, and at least includes a wireless communication network or RAT that is serviced by wireless LAN (WLAN) access points and which provides connectivity through these access points to the Internet. Most modern Wi-Fi networks (or WLAN networks) are based on IEEE 802.11 standards and are marketed under the name "Wi-Fi". A Wi-Fi (WLAN) network is different from a cellular network.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

Figure 2:
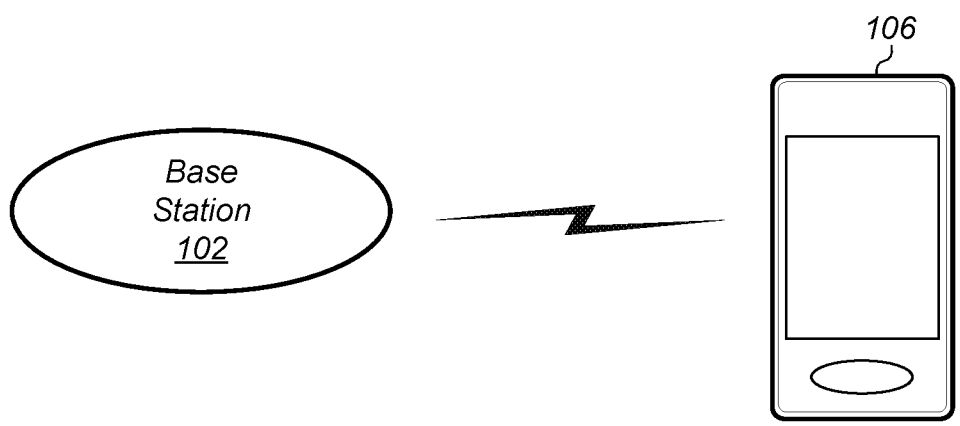
FIG. 2 illustrates an exemplary base station in communication with an exemplary wireless user equipment (UE) device, according to some embodiments.

FIGS. 1 and 2—Exemplary Communication System

FIG. 1 illustrates an exemplary (and simplified) wireless communication system in which aspects of this disclosure may be implemented, according to some embodiments. It is noted that the system of FIG. 1 is merely one example of a possible system, and embodiments may be implemented in any of various systems, as desired.

As shown, the exemplary wireless communication system includes a base station 102 which communicates over a transmission medium with one or more (e.g., an arbitrary number of) user devices 106A, 106B, etc. through 106N. Each of the user devices may be referred to herein as a "user equipment" (UE) or UE device. Thus, the user devices 106 are referred to as UEs or UE devices.

The base station 102 may be a base transceiver station (BTS) or cell site, and may include hardware and/or software that enables wireless communication with the UEs 106A through 106N. If the base station 102 is implemented in the context of LTE, it may alternately be referred to as an 'eNodeB' or 'eNB'. If the base station 102 is implemented in the context of 5G NR, it may alternately be referred to as a 'gNodeB' or 'gNB'. The base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication among the user devices and/or between the user devices and the network 100. The communication area (or coverage area) of the base station may be referred to as a "cell." As also used herein, from the perspective of UEs, a base station may sometimes be considered as representing the network insofar as uplink and downlink communications of the UE are concerned. Thus, a UE communicating with one or more base stations in the network may also be interpreted as the UE communicating with the network.

The base station 102 and the user devices may be configured to communicate over the transmission medium using any of various radio access technologies (RATs), also referred to as wireless communication technologies, or telecommunication standards, such as GSM, UMTS (WCDMA), LTE, LTE-Advanced (LTE-A), LAA/LTE-U, 5GNR, 3GPP2 CDMA2000 (e.g., 1×RTT, 1×EV-DO, HRPD, eHRPD), Wi-Fi, etc.

Base station 102 and other similar base stations operating according to the same or a different cellular communication standard may thus be provided as one or more networks of cells, which may provide continuous or nearly continuous overlapping service to UE 106 and similar devices over a geographic area via one or more cellular communication standards.

Note that a UE 106 may be capable of communicating using multiple wireless communication standards. For example, a UE 106 might be configured to communicate using either or both of a 3GPP cellular communication standard or a 3GPP2 cellular communication standard. In some embodiments, the UE 106 may be configured to perform grouped MIMO communications such as according to the various methods described herein. The UE 106 might also or alternatively be configured to communicate using WLAN, BLUETOOTH™, one or more global navigational satellite systems (GNSS, e.g., GPS or GLONASS), one and/or more mobile television broadcasting standards (e.g., ATSC-M/H), etc. Other combinations of wireless communication standards (including more than two wireless communication standards) are also possible.

FIG. 2 illustrates an exemplary user equipment 106 (e.g., one of the devices 106A through 106N) in communication with the base station 102, according to some embodiments. The UE 106 may be a device with wireless network connectivity such as a mobile phone, a hand-held device, a wearable device, a computer or a tablet, or virtually any type of wireless device. The UE 106 may include a processor (processing element) that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array), an integrated circuit, and/or any of various other possible hardware components that are configured to perform (e.g., individually or in combination) any of the method embodiments described herein, or any portion of any of the method embodiments described herein. The UE 106 may be configured to communicate using any of multiple wireless communication protocols. For example, the UE 106 may be configured to communicate using two or more of CDMA2000, LTE, LTE-A, 5G NR, WLAN, or GNSS. Other combinations of wireless communication standards are also possible.

The UE 106 may include one or more antennas for communicating using one or more wireless communication protocols according to one or more RAT standards. In some embodiments, the UE 106 may share one or more parts of a receive chain and/or transmit chain between multiple wireless communication standards. The shared radio may include a single antenna, or may include multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware.

In some embodiments, the UE 106 may include separate transmit and/or receive chains (e.g., including separate antennas and other radio components) for each wireless communication protocol with which it is configured to communicate. As a further possibility, the UE 106 may include one or more radios that are shared between multiple wireless communication protocols, and one or more radios that are used exclusively by a single wireless communication protocol. For example, the UE 106 may include a shared radio for communicating using either of LTE or CDMA2000 1×RTT (or LTE or NR, or LTE or GSM), and separate radios for communicating using each of Wi-Fi and BLUETOOTH™. Other configurations are also possible.

In a cellular communication system, a wireless device may be served by a cellular base station according to a cellular link, such as a cellular link established according to LTE, LTE-A, or 5G NR. For example, a wireless device may establish a session with an AMF entity of the cellular network by way of a gNB that provides radio access to the cellular network. Alternatively, or in addition, the cellular network may operate according to another cellular communication technology (e.g., LTE, UMTS, CDMA2000, GSM, etc.), according to various embodiments.

Establishing the wireless link may include establishing a RRC connection with the serving cellular base station, at least according to some embodiments. Establishing the RRC connection may include configuring various parameters for communication between the wireless device and the cellular base station, establishing context information for the wireless device, and/or any of various other possible features, e.g., relating to establishing an air interface for the wireless device to perform cellular communication with a cellular network associated with the cellular base station. After establishing the RRC connection, the wireless device may operate in a RRC connected state, in which the cellular base station may perform downlink data communications with the wireless device, among other possible types of communication.

Figure 3:
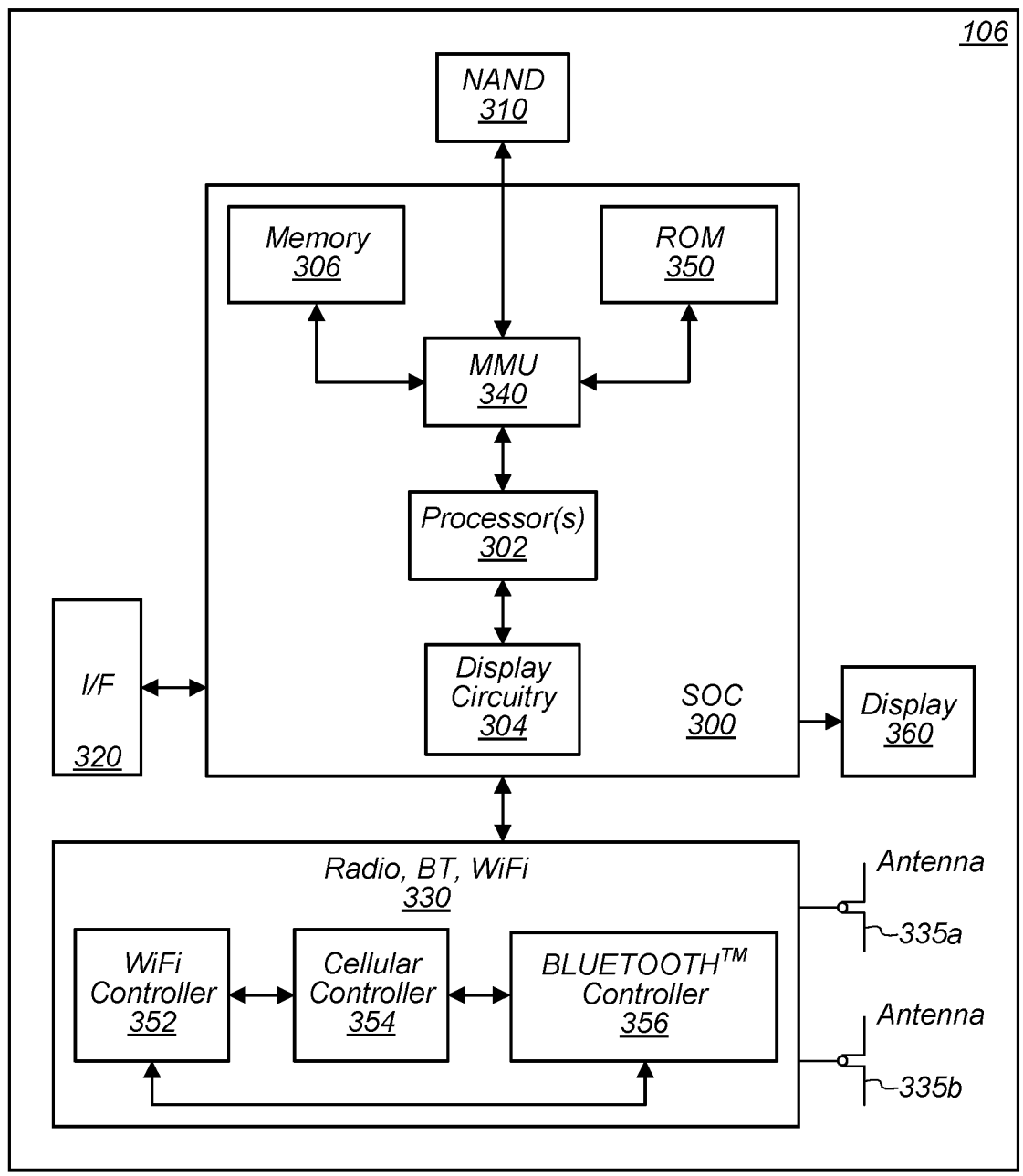
FIG. 3 illustrates an exemplary block diagram of a UE, according to some embodiments.

FIG. 3—Block Diagram of an Exemplary UE Device

FIG. 3 illustrates a block diagram of an exemplary UE 106, according to some embodiments. As shown, the UE 106 may include a system on chip (SOC) 300, which may include portions for various purposes. For example, as shown, the SOC 300 may include processor(s) 302 which may execute program instructions for the UE 106 and display circuitry 304 which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, radio 330, connectorI/F 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including NAND flash 310), a connector interface 320 (e.g., for coupling to a computer system, dock, charging station, etc.), the display 360, and wireless communication circuitry 330 (e.g., for LTE, LTE-A, NR, CDMA2000, BLUETOOTH™, Wi-Fi, GPS, etc.). The UE device 106 may include at least one antenna (e.g. 335a), and possibly multiple antennas (e.g. illustrated by antennas 335a and 335b), for performing wireless communication with base stations and/or other devices. Antennas 335a and 335b are shown by way of example, and UE device 106 may include fewer or more antennas. Overall, the one or more antennas are collectively referred to as antenna 335. For example, the UE device 106 may use antenna 335 to perform the wireless communication with the aid of radio circuitry 330. As noted above, the UE may be configured to communicate wirelessly using multiple wireless communication standards in some embodiments.

The UE 106 may include hardware and software components for implementing methods for the UE 106 to perform grouped MIMO communications such as described further subsequently herein. The processor(s) 302 of the UE device 106 may be configured to implement part or all of the methods described herein, e.g., by executing program instructions stored on a memory medium (e.g., a non-transitory computer-readable memory medium). In other embodiments, processor(s) 302 may be configured as a programmable hardware element, such as an FPGA (Field Programmable Gate Array), or as an ASIC (Application Specific Integrated Circuit). Furthermore, processor(s) 302 may be coupled to and/or may interoperate with other components as shown in FIG. 3, to perform grouped MIMO communications according to various embodiments disclosed herein. Processor(s) 302 may also implement various other applications and/or end-user applications running on UE 106.

In some embodiments, radio 330 may include separate controllers dedicated to controlling communications for various respective RAT standards. For example, as shown in FIG. 3, radio 330 may include a Wi-Fi controller 352, a cellular controller (e.g. for LTE, LTE-A, NR, etc.) 354, and BLUETOOTH™ controller 356, and in at least some embodiments, one or more or all of these controllers may be implemented as respective integrated circuits (ICs or chips, for short) in communication with each other and with SOC 300 (and more specifically with processor(s) 302). For example, Wi-Fi controller 352 may communicate with cellular controller 354 over a cell-ISM link or WCI interface, and/or BLUETOOTH' controller 356 may communicate with cellular controller 354 over a cell-ISM link, etc. While three separate controllers are illustrated within radio 330, other embodiments have fewer or more similar controllers for various different RATs that may be implemented in UE device 106.

Further, embodiments in which controllers may implement functionality associated with multiple radio access technologies are also envisioned. For example, according to some embodiments, the cellular controller 354 may, in addition to hardware and/or software components for performing cellular communication, include hardware and/or software components for performing one or more activities associated with Wi-Fi, such as Wi-Fi preamble detection, and/or generation and transmission of Wi-Fi physical layer preamble signals.

In some embodiments, the UE 106 may be configured within (e.g., as part of) a high-speed vehicle such as a high-speed train, an airplane, a boat, or another type of vehicle, to provide cellular access to other devices and/or systems within the vehicle.

Figure 4:
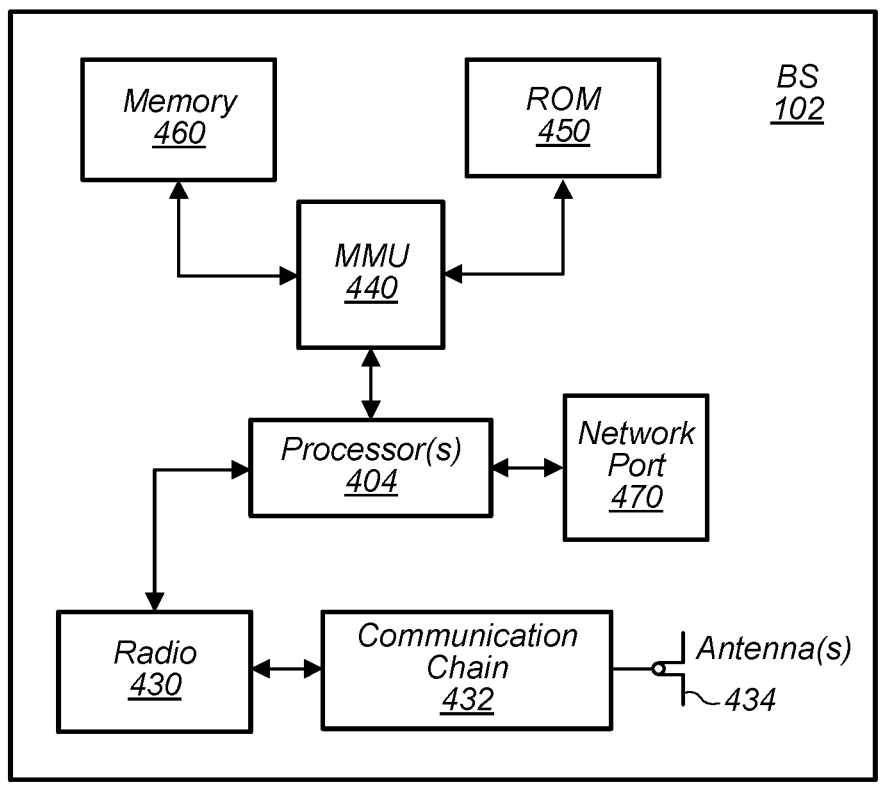
FIG. 4 illustrates an exemplary block diagram of a base station, according to some embodiments.

FIG. 4—Block Diagram of an Exemplary Base Station

FIG. 4 illustrates a block diagram of an exemplary base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2. The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas (e.g., to support grouped MIMO communications such as described further subsequently herein). The antenna(s) 434 may be configured to operate as a wireless transceiver and may be further configured to communicate with UE devices 106 via radio 430. The antenna(s) 434 communicates with the radio 430 via communication chain 432. Communication chain 432 may be a receive chain, a transmit chain or both. The radio 430 may be designed to communicate via various wireless telecommunication standards, including, but not limited to, NR, LTE, LTE-A, WCDMA, CDMA2000, etc. The processor 404 of the base station 102 may be configured to implement and/or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. In the case of certain RATs, for example Wi-Fi, base station 102 may be designed as an access point (AP), in which case network port 470 may be implemented to provide access to a wide area network and/or local area network (s), e.g. it may include at least one Ethernet port, and radio 430 may be designed to communicate according to the Wi-Fi standard. The base station 102 may operate according to the various methods as disclosed herein for performing grouped MIMO communications in a cellular communication system.

High Speed Mobility Scenarios

In some embodiments, a UE or another type of device may conduct cellular communications in a high-speed mobility scenario such as a high-speed train (e.g., a magnetic levitation (Maglev) train), an airplane, or a boat, among other possibilities. In these embodiments, it may be desirable to correct for a Doppler shift experienced by a high-speed UE communicating with a stationary base station.

Figure 5:
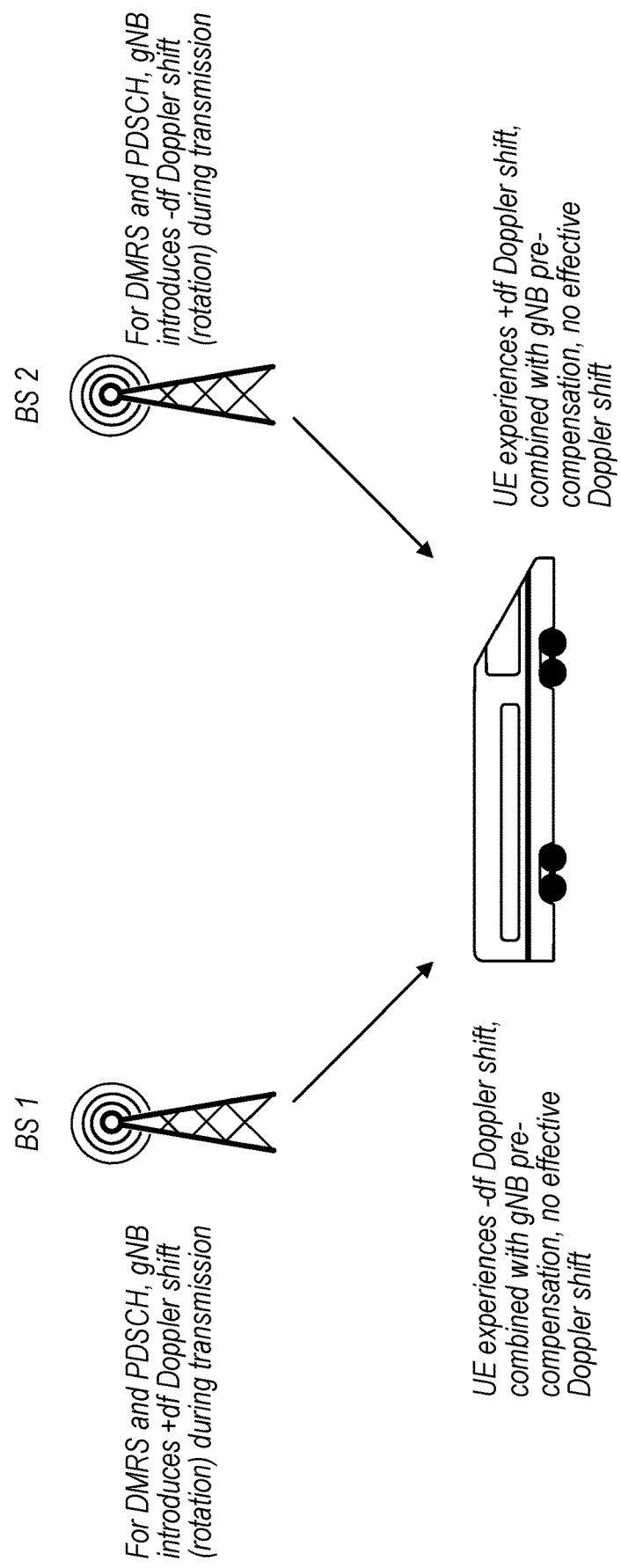
FIG. 5 is a schematic illustration of a high-speed train moving between two base stations, where the base stations perform pre-compensation to remove a Doppler shift, according to some embodiments.

For example, as shown in FIG. 5, a high-speed train (HST) configured to conduct cellular communications may travel between two base stations and may experience a very high positive Doppler shift from one BS and a very high negative Doppler shift from the other BS. As results, the composite channel may vary quickly, close to or more than 2 kHz. This variation may reduce the channel capability and/or make it challenging for the wireless device to perform accurate channel estimation.

To address these and other concerns, different deployments may allow the UE to estimate two separate Doppler shifts, one from each BS, to assist UE channel estimation. Alternatively, the network (NW) may pre-compensate for the Doppler shift, where the network applies a frequency shift to its transmissions to the UE that is equal in magnitude but opposite in sign to the Doppler shift. To facilitate Doppler shift pre-compensation, the UE may inform the NW of the Doppler shift that the UE is experiencing. The NW may estimate the Doppler shift based on UE uplink (UL transmissions), e.g., SRS, DMRS, etc. Alternatively, the NW may estimate Doppler shift based on explicit reporting from the UE. Embodiments herein present methods and devices for a high-mobility UE to utilize either a) channel state information (CSI)-ReportConfig messaging or b) media access control-control element (MAC-CE) messaging to report Doppler shift estimates to the NW.

Figure 6:
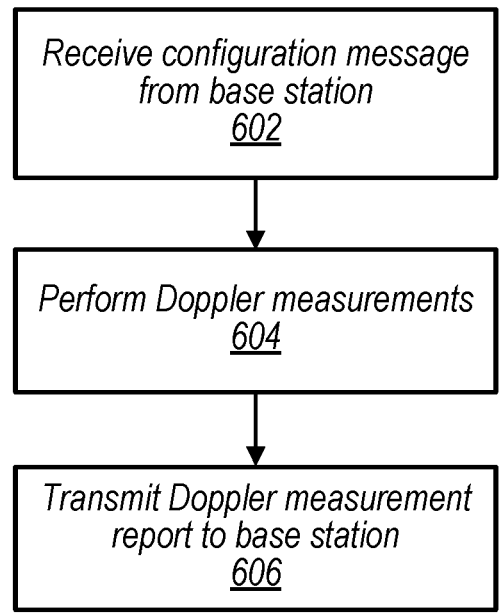
FIG. 6 is a flowchart diagram illustrating a method for a reporting device to provide a Doppler measurement report to one or more base stations responsive to receiving a configuration message, according to some embodiments.
Figure 7:
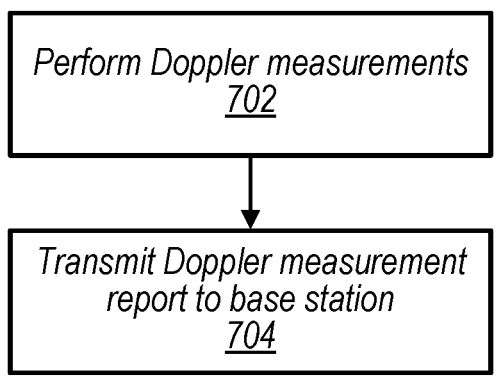
FIG. 7 is a flowchart diagram illustrating a method for a reporting device to autonomously provide a Doppler measurement report to one or more base stations, according to some embodiments.

FIGS. 6-7—Doppler Measurement Reporting

FIGS. 6-7 are flowchart diagrams illustrating methods for a wireless device to perform Doppler measurement reporting to a cellular base station, according to some embodiments. Aspects of the methods of FIGS. 6-7 may be implemented by wireless devices, such as a UE 106 or another type of device and a BS 102 illustrated in and described with respect to various of the Figures herein, or more generally in conjunction with any of the computer circuitry, systems, devices, elements, or components shown in the above Figures, among other devices, as desired. For example, a processor (and/or other hardware) of such a device may be configured to cause the device to perform any combination of the illustrated method elements and/or other method elements. In some embodiments, a high-speed vehicle (e.g., a high-speed train, boat or airplane) may have installed thereon a cellular transceiver configured to communicate with one or more base stations (e.g., gNBs). The cellular transceiver may be configured to provide cellular access to other devices in the vehicle (i.e., smart phones, tablets, laptops, etc.) through a wireless local area network. In general, the device that is performing and reporting the Doppler shift measurements may be variously referred to as a "reporting device", a "device", a "wireless device", or a "UE". In some embodiments, the methods described in FIGS. 6-7 may be performed by the cellular transceiver installed in the vehicle. Alternatively or additionally, individual UE devices within the vehicle may be configured to perform the described method steps. Note that while at least some elements of the methods of FIG. 6 are described in a manner relating to the use of communication techniques and/or features associated with LTE, LTE-A, NR, and/or 3GPP specification documents, such description is not intended to be limiting to the disclosure, and aspects of the methods of FIGS. 6-7 may be used in any suitable wireless communication system, as desired. The methods described in FIGS. 6 and 7 are similar in some respects, but differ in that FIG. 6 describes a method whereby the device receives configuration information from a base station prior to performing Doppler measurement reporting, whereas FIG. 7 describes a method where the device autonomously performs Doppler measurement reporting.

In various embodiments, some of the elements of the methods shown may be performed concurrently, in a different order than shown, may be substituted for by other method elements, or may be omitted. Additional method elements may also be performed as desired. As shown, the method of FIG. 6 may operate as follows.

At 602, a configuration message is received from a first base station. The configuration message specifies one or more parameters of a Doppler measurement report. In some embodiments, the configuration message is a channel state information (CSI)-ReportConfig message, and the Doppler measurement report is included within a CSI transmission. The one or more parameters may include an instruction for the device to perform a plurality of Doppler measurements on the first base station and report an average over the plurality of Doppler measurements. This instruction may be included in a resourcesForChannelMeasurement information element (IE) of a CSI-ReportConfig message, in some embodiments. The one or more parameters may additionally instruct the device to perform and report Doppler shift measurements on a second base station. For example, a device on a high-speed train may be moving between and may be currently in communication range of two base stations, and the configuration message may instruct the device to measure the Doppler shift of both base stations.

The parameters may additionally or alternatively include a specification of one or more time and frequency resources for transmitting the Doppler measurement report.

In some embodiments, the one or more parameters may include a minimum absolute reportable Doppler shift, a maximum absolute reportable Doppler shift and a quantization step size. The minimum and maximum absolute reportable Doppler shift specify the minimum and maximum values that the device is permitted to report (e.g., 0 Hz and 8000 Hz, or another pair of values), and the quantization step size (e.g., 100 Hz) specifies the resolution for reporting the Doppler shift (i.e., the device may round its Doppler measurement to the nearest step, for example, a measured Doppler shift of 813 Hz may be rounded to and reported as 800 Hz for a step size of 100 Hz).

At 604, Doppler measurements are performed. The Doppler measurements may include one or more first Doppler measurements performed on the first base station. The Doppler measurements measure the Doppler shift on messaging between the device and the first base station. The one or more first Doppler measurements may be performed responsive to receiving the configuration message. The one or more Doppler measurements may include a plurality of Doppler measurements on the first base station, and the Doppler measurement report may specify an average of the plurality of Doppler measurements.

The Doppler measurements may further include one or more second Doppler measurements on a second base station. The first base station may be a receding base station relative to the device, while the second base station is approaching, or vice versa. The Doppler measurement report may be further based on the one or more second Doppler measurements. In various embodiments, the Doppler measurement report may report a differential of the first and second Doppler measurements, or it may individually report the first and second Doppler measurements. In some embodiments, the device may transmit a first Doppler measurement to the first base station that includes the first Doppler measurement results, and a second Doppler measurement to the second base station that includes the second Doppler measurement results. Alternatively, the device may transmit the same Doppler measurement report to both the first and second base stations, and the Doppler measurement report may include both the first and second Doppler measurement results (or it may specify only the differential between the first and second Doppler measurement results).

Depending on the velocity of the reporting device and the relative locations of the first base station, the second base station and the reporting device, the Doppler shifts of the first and second base stations may be similar in magnitude and opposite in sign. For example, if the velocity of the reporting device and the locations of the first base station, the second base station, and the reporting device are all colinear, the Doppler shifts of the first and second base stations will be substantially identical in magnitude (for example, if the reporting device is moving in a straight line directly away from the first base station and directly toward the second base station, the Doppler shifts of the base stations will be equal in magnitude and opposite in sign). In some circumstances, the locations of the two base stations and the reporting device may deviate slightly from collinearity (e.g., when a high-speed train is travelling in a straight line away from the first base station and toward the second base station, and the base stations are miles apart and several hundred feet away from the train tracks). In these situations, the Doppler shifts of the first and second base stations will differ in magnitude by an amount that increases, for example, as one base station's location is moved farther away from the train tracks. For CSI Doppler measurement reporting, reporting a differential between two Doppler measurements utilizes fewer network resources than reporting each Doppler measurement individually. In some embodiments, the base stations may instruct the reporting device to report the differential measurement, thus reducing the network load, and each base station may assume its Doppler shift is equal to half of the differential measurement (thus incurring a slight error, depending on the deviation from collinearity). The first and second base stations may each implement pre-compensation on transmissions to the reporting device with opposite signs and a common magnitude equal to half the differential. Alternatively, in some embodiments, the first (or second) base station may implement pre-compensation with the full differential and the other base station may not implement pre-compensation. In these embodiments, the differential Doppler shift between the two base stations may be substantially removed or reduced, even though an absolute Doppler shift for the two base stations may persist. Reporting the differential Doppler shift between the two base stations may be desirable when the deviation from collinearity of the base stations and the reporting device is sufficiently small. Alternatively, for deployments with significant deviations from linearity, it may be desirable for the base stations to instruct the UE to individually report each of the two Doppler shift measurements to the two base stations.

At 606, the Doppler measurement report is transmitted to the first base station. The Doppler measurement report is based at least on the one or more first Doppler measurements and the one or more parameters. For example, the Doppler measurement report may be constructed by the reporting device according to the one or more parameters. The Doppler measurement report may additionally be transmitted to one or more other base stations, or each base station may receive a distinct Doppler measurement report. The Doppler measurement report may be included within a CSI message. The Doppler measurement report may be used by the first and/or second base stations to perform pre-compensation of their respective Doppler shifts, as shown in FIG. 5, so that the device receives signals from the base stations without a Doppler shift (or with a substantially reduced Doppler shift). For example, the device may receive communications from the first and/or second base stations that have been Doppler pre-compensated based on the Doppler measurement report.

In some embodiments, the Doppler measurement report specifies that the Doppler measurement report is invalid. For example, if the measured Doppler shift is outside the range of reportable Doppler shifts indicated by the configuration message, the device may report an invalid measurement result. Alternatively, if the device is unable to complete the Doppler measurements and transmit the Doppler measurement report quickly enough (e.g., if it is unable to complete this process within a time specified by the configuration message), the device may report an invalid measurement result.

In some embodiments, the Doppler measurement report is transmitted according to aperiodic timing with low latency. In these embodiments, the Doppler measurement report may be provided with an acknowledgment message. The device may allocate all available CSI processing units to preparing and providing the Doppler measurement report when the Doppler measurement report is to be transmitted with aperiodic timing with low latency.

FIG. 7 describes a method for a device to autonomously perform Doppler measurement reporting without receiving a configuration message from a base station before performing the Doppler measurements and reporting. It may be understood that any applicable embodiment (i.e., any embodiment that does not include a configuration message) described above in reference to FIG. 6 may be likewise implemented in the methods described in reference to FIG. 7. For simplicity, these embodiments will not be described again in the description of FIG. 7.

In various embodiments, some of the elements of the methods shown may be performed concurrently, in a different order than shown, may be substituted for by other method elements, or may be omitted. Additional method elements may also be performed as desired. As shown, the method of FIG. 7 may operate as follows.

At 702, Doppler measurements are performed. The Doppler measurements may include one or more first Doppler measurements on a first base station and/or one or more second Doppler measurements on a second base station. The device may autonomously determine to perform the Doppler measurements and transmit the Doppler measurement report(s).

In some embodiments, the device may determine that the one or more first Doppler measurements have changed compared to previous Doppler measurements on the first base station by more than a predetermined threshold amount. The device may periodically perform Doppler measurements on connected base stations to determine when the Doppler shift has changed by more than the predetermined threshold amount. The predetermined threshold amount may be selected such that a message received with the predetermined threshold amount of uncompensated Doppler shift may be difficult to successfully receive and/or decode by the device. In these embodiments, the device may transmit the Doppler measurement report to the first base station responsive to the determination that the one or more first Doppler measurements have changed compared to the previous Doppler measurements by more than the predetermined threshold amount.

At 704, the Doppler measurement report is transmitted to the first base station. The Doppler measurement report is based on the one or more first Doppler measurements and/or second Doppler measurements. The Doppler measurement report may be used by the first and/or second base stations to perform pre-compensation of their respective Doppler shifts, as shown in FIG. 5, so that the device receives signals from the base stations without a Doppler shift (or with a substantially reduced Doppler shift). For example, the device may receive communications from the first and/or second base stations that have been Doppler pre-compensated based on the Doppler measurement report. The Doppler measurement report may individually report Doppler shifts of the first and second base stations, or it may report a differential between the Doppler shifts of the first and second base stations.

In some embodiments, subsequent to transmitting the Doppler measurement report, the device may refrain from transmitting subsequent Doppler measurement reports to the base station until expiration of a prohibit period. For example, the network may inform the device of a prohibit period, whereby the device will not transmit a second Doppler measurement report to the base station within the prohibit period after transmitting the first Doppler measurement report.

In some embodiments, the device may transmit a scheduling request message to the base station on a physical uplink control channel (PUCCH) and receive an uplink grant from the base station. In these embodiments, the Doppler measurement report may be transmitted according to the uplink grant.

In some embodiments, the Doppler measurement report is transmitted within a media access control-control element (MAC-CE) message. The MAC-CE message may further include a serving cell ID of the serving cell in which the Doppler shift is measured and/or a base station ID of the base station whose Doppler shift is measured, in addition to the absolute or differential quantized Doppler shift measurement. The base station ID may be a logic ID such as a CSI-ReportConfigId or a NZP-CSI-RS-ResourceSetId, in which trs-info may be configured.

FIGS. 8-11—Additional Supporting Material

FIGS. 8-11 provide additional supporting material to describe details of embodiments described herein.

In some embodiments, a CSI-ReportConfig message may be transmitted by a base station to a device to configure parameters for Doppler measurement reporting by the device. The CSI-ReportConfig message may set its reportQuantity field to a value other than 'none' to indicate that the device is to provide Doppler measurement reporting using a channel measurement resource (CMR). The CMR may be configured using a tracking reference signal-information (trs-Info) field, which may configure a non-zero power (NZP) CSI-resource set (CSI-RS) as the CMR using the CSI-ReportConfig message. In various embodiments, configuring Doppler measurement reporting may be performed for aperiodic tracking reference signals (AP-TRS), periodic tracking reference signals (P-TRS), or semi-persistent tracking reference signals (SP-TRS).

The timeRestrictionForChannelMeasurements field in the CSI-ReportConfig message may be used to instruct the device to perform multiple Doppler shift measurements on the base station and report the average over multiple measurements. In some embodiments, the CSI-ReportConfig message may configure the device to reserve two resource sets (i.e., two sets of time and frequency resources) for Doppler measurement reporting to two different base stations (e.g., a receding base station and an approaching base station as shown in FIG. 5). FIG. 8 illustrates an example message format, where the resourcesForChannelMeasurement field may be used to indicate the resource set(s) to be used for Doppler measurement reporting for each of one or more base stations.

In some embodiments, as shown in FIG. 9, the CSI-AssociatedReportConfigInfo field may be used to reserve one or more resource sets for Doppler measurement reporting for one or more respective base stations. The resourceSet field may be used to designate the reserved resource set(s). In some embodiments, an interference measurement resource (IMR), which may be a zero power IMR (e.g., CSI-IM) or a non-zero power IMR (e.g., NZP-CSI-RS) may not be configured for performing Doppler measurement reporting.

In some embodiments, the reportQuantity field shown in FIG. 10 may be used to instruct the reporting device on how to report the Doppler measurements. For example, the reportQuantity field may be used to specify whether the reporting device should report absolute Doppler shift measurements for one or more base stations, or differential Doppler shift measurements between two or more base stations. Two sets of TRS may be configured as CMRs in the corresponding CSI-ReportConfig message, where each set of TRS corresponds to one base station.

The reportQuantity field may further specify reporting parameters for the Doppler measurements. For example, it may specify that the reporting device is to report the sign (i.e., + or −) of the Doppler measurement. It may also specify the minimum and maximum reportable Doppler shift (e.g., 0 Hz to 8000 Hz, or another range) and the quantization step size (e.g., 100 Hz). For example, the reportQuantity field may inform the reporting device that it is allowed to report Doppler shifts up to the maximum reportable value, and that it should report Doppler shifts in increments of the quantization step size. The reportQuantity field may further specify that the UE may report an invalid entry in its Doppler measurement report, e.g., when the reporting value is out of range (e.g., is larger than the maximum reportable value) or when the reporting device has insufficient processing power to complete the Doppler measurement and provide the report within a designated latency.

In some embodiments, computational resources for a reporting device may be counted in terms of CSI processing units. A device may have a certain available computational capacity to process a limited number of simultaneous Doppler measurement reports (e.g., if it receives CSI-ReportConfig instructions from multiple base stations). The reporting device may count each received CSI-ReportConfig message as reserving a fixed number of CSI processing units, e.g., 1 or 2, for performing Doppler measurements and reporting. Alternatively, the CSI processing units per each CSI-ReportConfig message may be variable, e.g., it may vary depending on the parameters of the respective CSI-ReportConfig message. For example, the number of CSI processing units associated with a CSI-ReportConfig message may be proportional to the number of resource sets reservations specified in the CSI-ReportConfig message. The rule for counting CSI processing units may be established according to a cellular telecommunication standard, or it may be reported by a UE as UE capability information.

A reporting device may be configured to accept and process CSI-ReportConfig messages until its maximum number of CSI processing units have been allocated, upon which the device may provide an invalid Doppler measurement report in response to any subsequent CSI-ReportConfig messages to indicate that the device currently has insufficient processing bandwidth to produce and provide additional Doppler measurements.

FIGS. 11A and 11B are tables illustrating two potential sets of timing parameters for aperiodic CSI transmission. In FIGS. 11A and 11B, Z is the minimum timing offset between the last symbol of the physical downlink control channel (PDCCH) message triggering the CSI report (i.e., CSI-ReportConfig message) and the first uplink symbol to carry the corresponding CSI report(s), including the effect of the timing advance. Z' is the minimum timing offset between the last symbol of the last reference signal used for measurement and the first uplink symbol to carry the corresponding CSI report(s), including the effect of the timing advance. Table 11A illustrates a lower latency set of Z and Z', whereas Table 11B illustrates a higher latency set of Z and Z'. The variable $\mu$ is an index representing different subcarriers. The reporting UE may use a lower latency set of Z and Z' in certain scenarios. For example, a low latency set of minimum timing offsets may be used when the CSI Doppler measurement report is triggered through a transport block or is provided within a hybrid automatic repeat request acknowledgment (HARQ-ACK) message rather than being transmitted within a physical uplink shared channel (PUSCH). Alternatively or additionally, a reporting device may elect to use the low latency set of timing offsets when it is currently preparing a CSI Doppler measurement report for only a single base station. In these embodiments, the reporting device may allocate all of its CSI processing units to providing the Doppler measurement report, to facilitate satisfying the lower latency minimum timing offsets.

Still another exemplary embodiment may include a method, comprising: by a device: performing any or all parts of the preceding examples.

Still another exemplary embodiment may include a method, comprising: by a base station: performing any or all parts of the preceding examples.

A further exemplary embodiment may include a device, comprising: an antenna; a radio coupled to the antenna; and a processing element operably coupled to the radio, wherein the device is configured to implement any or all parts of the preceding examples.

Another exemplary embodiment may include an apparatus, comprising a processor configured to implement any or all parts of the preceding examples.

Yet another exemplary set of embodiments may include a non-transitory computer accessible memory medium comprising program instructions which, when executed at a device, cause the device to implement any or all parts of any of the preceding examples.

A still further exemplary set of embodiments may include a computer program comprising instructions for performing any or all parts of any of the preceding examples.

A yet further exemplary set of embodiments may include an apparatus comprising means for performing any or all of the elements of any of the preceding examples.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Embodiments of the present invention may be realized in any of various forms. For example, in some embodiments, the present invention may be realized as a computer-implemented method, a computer-readable memory medium, or a computer system. In other embodiments, the present invention may be realized using one or more custom-designed hardware devices such as ASICs. In other embodiments, the present invention may be realized using one or more programmable hardware elements such as FPGAs.

In some embodiments, a non-transitory computer-readable memory medium (e.g., a non-transitory memory element) may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE) may be configured to include a processor (or a set of processors) and a memory medium (or memory element), where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

The invention claimed is:

1. A device, comprising:
a radio operably coupled to an antenna; and
a processor operably coupled to the radio, wherein the device is configured to:
receive a configuration message from a first base station, wherein the configuration message specifies one or more parameters of a Doppler measurement report;
perform one or more first Doppler measurements on the first base station; and
transmit the Doppler measurement report to the first base station, wherein the Doppler measurement report is based on the one or more first Doppler measurements and the one or more parameters.

2. The device of claim 1,
wherein the one or more first Doppler measurements are performed responsive to receiving the configuration message.

3. The device of claim 1,
wherein the one or more parameters comprise an instruction to perform a plurality of first Doppler measurements,
wherein performing the one or more first Doppler measurements comprises performing the plurality of first Doppler measurements, and
wherein the Doppler measurement report is based on an average of the plurality of first Doppler measurements.

4. The device of claim 1, wherein the device is further configured to:
perform one or more second Doppler measurements on a second base station, wherein the Doppler measurement report is further based on the one or more second Doppler measurements.

5. The device of claim 4,
wherein the Doppler measurement report comprises a differential of the first and second Doppler measurements.

6. The device of claim 1,
wherein the one or more parameters comprise a specification of one or both of:
one or more time and frequency resources for performing the one or more first Doppler measurements; and
one or more time and frequency resources for transmitting the Doppler measurement report.

7. The device of claim 1,
wherein the Doppler measurement report specifies that the Doppler measurement report is invalid.

8. The device of claim 1,
wherein the one or more parameters comprise:
a minimum absolute reportable Doppler shift;
a maximum absolute reportable Doppler shift; and
a quantization step size.

9. The device of claim 1,
wherein the Doppler measurement report is provided according to aperiodic timing with low latency, and
wherein the Doppler measurement report is provided with an acknowledgment message.

10. The device of claim 1,
wherein the device comprises a cellular transceiver installed on a high-speed train.

11. The device of claim 1,
wherein the configuration message comprises a channel state information (CSI)-ReportConfig message, and
wherein the Doppler measurement report is comprised within a CSI transmission.

12. A non-transitory computer-readable memory medium comprising program instructions which, when executed by a processor, cause a first base station to:
transmit a configuration message to a device, wherein the configuration message instructs the device to perform one or more first Doppler measurements on the first base station and specifies one or more parameters of a Doppler measurement report;
receive the Doppler measurement report from the device, wherein the Doppler measurement report is based on the one or more parameters and results of the one or more first Doppler measurements; and
transmit communications to the device with Doppler pre-compensation, wherein the Doppler pre-compensation is based on the Doppler measurement report.

13. The non-transitory computer-readable memory medium of claim 12,
wherein the one or more parameters comprise an instruction to perform a plurality of first Doppler measurements, and
wherein the Doppler measurement report is based on an average of the plurality of first Doppler measurements.

14. The non-transitory computer-readable memory medium of claim 12,
wherein the configuration message further instructs the device to perform one or more second Doppler measurements on a second base station,
wherein the Doppler measurement report is further based on the one or more second Doppler measurements,
wherein the Doppler measurement report comprises a differential of the first and second Doppler measurements, and
wherein the communications transmitted to the device are Doppler pre-compensated with half or all of the differential of the first and second Doppler measurements.

15. A method, comprising:
performing one or more first Doppler measurements on a first base station;

transmitting the Doppler measurement report to the first base station, wherein the Doppler measurement report is based on the one or more first Doppler measurements; and receiving communications from the first base station, wherein the communications are Doppler pre-compensated by the first base station based on the Doppler measurement report.

16. The method of claim 15, the method further comprising:

determining that the one or more first Doppler measurements have changed compared to previous Doppler measurements on the first base station by more than a predetermined threshold amount, wherein transmitting the Doppler measurement report is performed responsive to the determination that the one or more first Doppler measurements have changed compared to the previous Doppler measurements by more than the predetermined threshold amount.

17. The method of claim 15, the method further comprising:

subsequent to transmitting the Doppler measurement report, refraining from transmitting subsequent Doppler measurement reports to the base station until expiration of a prohibit period.

18. The method of claim 15, the method further comprising:

transmitting a scheduling request message to the base station on a physical uplink control channel (PUCCH); and receiving a PUCCH resource configuration or uplink grant from the base station, wherein the Doppler measurement report is transmitted according to the PUCCH resource configuration or uplink grant.

19. The method of claim 15, the method further comprising:

receiving an uplink grant from the base station, wherein the Doppler measurement report is transmitted within a media access control-control element (MAC-CE) message, and wherein the Doppler measurement report is transmitted according to the uplink grant.

20. The method of claim 15, the method further comprising:

performing one or more second Doppler measurements on a second base station, wherein the Doppler measurement report is further based on the one or more second Doppler measurements, and wherein the Doppler measurement report comprises a differential of the first and second Doppler measurements.

* * * * *